(12) United States Patent
Sasano et al.

(10) Patent No.: US 11,602,121 B2
(45) Date of Patent: Mar. 14, 2023

(54) PET ABSORBENT SHEET

(71) Applicant: Unicharm Corporation, Ehime (JP)

(72) Inventors: Yasuhiro Sasano, Kanonji (JP); Satoshi Hasegawa, Edgewater, NJ (US); Takeshi Ikegami, Fort Lee, NJ (US)

(73) Assignee: Unicharm Corporation, Ehime (JP)

( * ) Notice: Subject to any disclaimer, the term of this patent is extended or adjusted under 35 U.S.C. 154(b) by 341 days.

(21) Appl. No.: 16/908,069

(22) Filed: Jun. 22, 2020

(65) Prior Publication Data

US 2020/0323167 A1 Oct. 15, 2020

Related U.S. Application Data

(63) Continuation of application No. PCT/JP2018/043397, filed on Nov. 26, 2018.

(30) Foreign Application Priority Data

Dec. 21, 2017 (JP) .............................. JP2017-245526

(51) Int. Cl.
*A01K 1/015* (2006.01)
(52) U.S. Cl.
CPC ................................. *A01K 1/0157* (2013.01)
(58) Field of Classification Search
CPC .... A01K 1/0157; A01K 1/0107; A01K 1/015; A01K 23/005
See application file for complete search history.

(56) References Cited

U.S. PATENT DOCUMENTS

| 2014/0261208 A1 | 9/2014 | Calimano et al. |
| 2014/0331749 A1* | 11/2014 | Perissi ................... A01K 15/02 73/73 |

FOREIGN PATENT DOCUMENTS

| EP | 1048206 A2 | 11/2000 | |
| JP | 2012-029612 A | 2/2012 | |
| JP | 2012-029624 A | 2/2012 | |
| JP | 2012-050405 A | 3/2012 | |
| JP | 2012-075333 A | 4/2012 | |
| JP | 2012-213338 A | 11/2012 | |
| JP | 5728123 B1 * | 6/2015 | ........... A01K 1/0107 |
| WO | WO-2014092030 A1 * | 6/2014 | ........... A01K 1/0107 |

OTHER PUBLICATIONS

Office Action issued in the counterpart Chinese Patent Application No. 201880081698.0, dated Jun. 15, 2021 (15 pages).
International Search Report issued in International Application No. PCT/JP2018/043397, dated Dec. 25, 2018 (4 pages).
(Continued)

*Primary Examiner* — Trinh T Nguyen
(74) *Attorney, Agent, or Firm* — Osha Bergman Watanabe & Burton LLP

(57) ABSTRACT

A pet absorbent sheet includes: an absorbent core; and a liquid-permeable sheet disposed closer to a top side of the pet absorbent sheet than the absorbent core and that includes a plurality of hydrophilic fibers. The liquid-permeable sheet has waterproof regions that contain a water resisting agent. The water resisting agent is formed to surround gaps between fibers formed of the plurality of hydrophilic fibers.

7 Claims, 4 Drawing Sheets

(56) References Cited

OTHER PUBLICATIONS

Notification of Reasons for Refusal issued in Japanese Patent Application No. 2017-245526, dated May 19, 2020 (6 pages).
Written Opinion issued in International Application No. PCT/JP2018/043397, dated Dec. 25, 2018 (4 pages).
Notification of Reasons for Refusal issued in corresponding Japanese Patent Application No. 2017-245526, dated Sep. 15, 2020 (6 pages).
Extended European Search Report issued in corresponding European Application No. 18891686.0, dated Sep. 24, 2020 (7 pages).

* cited by examiner

PET ABSORBENT SHEET

CROSS-REFERENCE TO RELATED APPLICATIONS

The entire content of Japanese Patent Application No. 2017-245526 (filed on Dec. 21, 2017) is incorporated into the specification of the present application by reference.

TECHNICAL FIELD

The present invention generally relates to a pet absorbent sheet for absorbing pets' excrement, for example, urine.

BACKGROUND ART

A pet absorbent sheet for absorbing pets' excrement, for example, urine is known (refer to Patent Literature 1). The pet absorbent sheet has a liquid-impermeable back sheet, a liquid-permeable top sheet, and an absorber located between the back sheet and the sheet.

The pet absorbent sheet described in Patent Literature 1 has a print portion printed using an ink composition containing a pH indicator that changes in color depending on the pH of urine by contact with the urine. According to this pet absorbent sheet, it is considered that the pH of urine can be more accurately found out from the fact that the pH indicator changes in color on the basis of the pH of the urine.

PATENT LITERATURE

Patent Literature 1: Japanese Unexamined Patent Publication No. 2012-50405

There is still room for improvement in indicating the range of excrement, particularly, urine that has spread in a pet absorbent sheet. For example, in the case of not knowing the range of excrement that has spread in a pet absorbent sheet, there is a case where a user, for example, a pet guardian has a difficulty in realizing when to change the pet absorbent sheet.

In addition, pets, for example, dogs often have a habit of newly carrying out excretion in a region that is not contaminated by their own excrement. However, in a case where a pet has a difficulty in finding out the range of excrement that has spread in a pet absorbent sheet, there is also a possibility such that the pet may carry out excretion in a separate place instead of carrying out excretion on a pet absorbent sheet still having an excrement-free region.

SUMMARY

One or more embodiments provide a pet absorbent sheet making it easier to find out the range of excrement, for example, urine that has spread therein.

A pet absorbent sheet comprises: an absorbent core; a liquid-permeable sheet that is provided closer to a top side than the absorbent core and includes a plurality of hydrophilic fibers; and a plurality of waterproof regions including a water resisting agent that is partially provided in the liquid-permeable sheet. In other words, the liquid-permeable sheet has waterproof regions containing a water resisting agent. The water resisting agent in the waterproof regions is formed to surround gaps between fibers formed of the plurality of hydrophilic fibers.

DETAILED DESCRIPTION

(1) Outline of Embodiments

Figure 1:
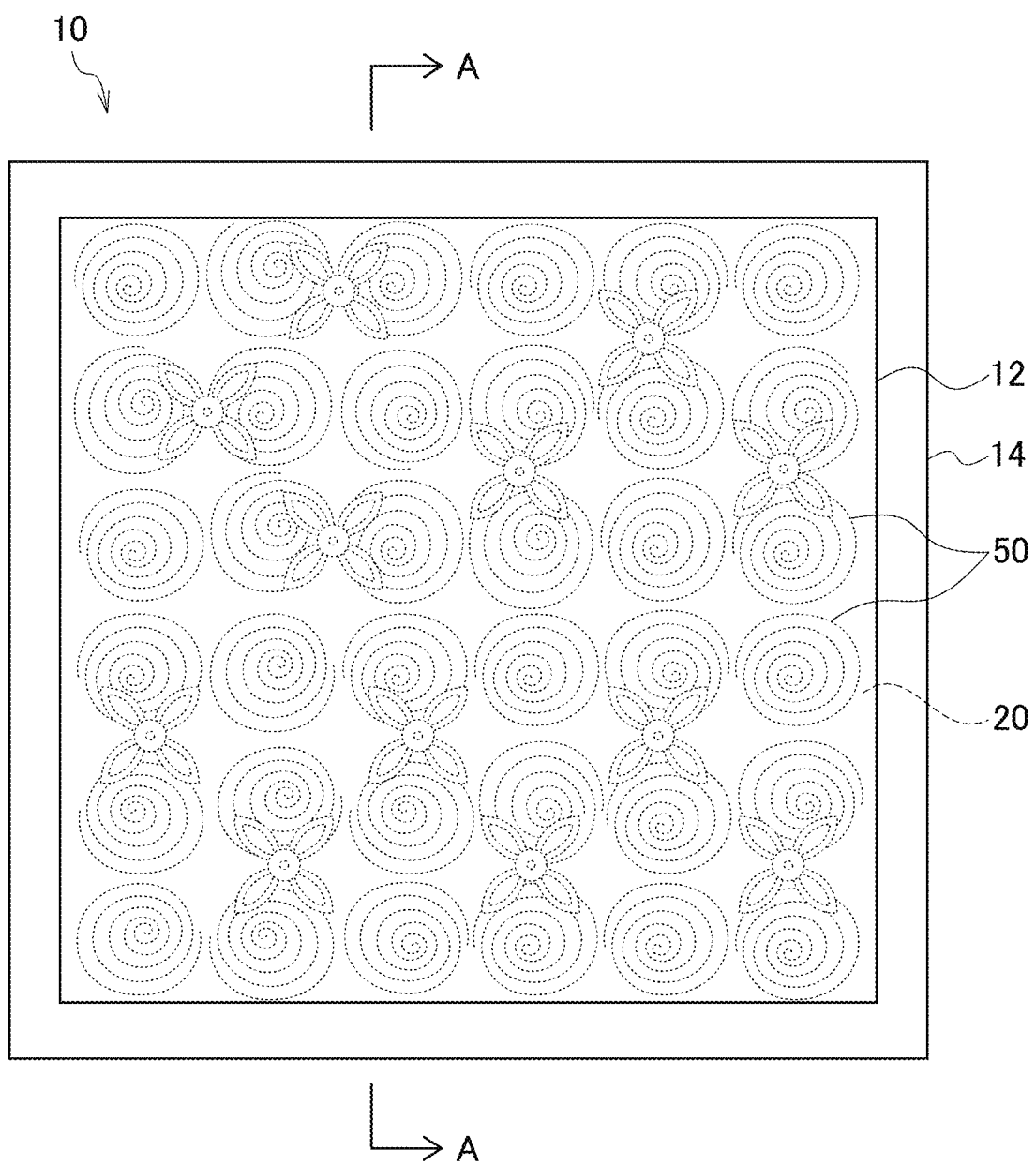
FIG. 1 is a plan view of a pet absorbent sheet according to a first embodiment.

Description of the present specification and accompanying drawings clarify at least the following matters.

A pet absorbent sheet according to one aspect comprises: an absorbent core; a liquid-permeable sheet that is provided closer to a top side than the absorbent core and includes a plurality of hydrophilic fibers; and a plurality of waterproof regions including a water resisting agent that is partially provided in the liquid-permeable sheet (that is, the liquid-permeable sheet has waterproof regions that contain a water resisting agent), wherein the water resisting agent in the waterproof regions is formed to surround gaps between fibers formed of the plurality of hydrophilic fibers.

According to the present aspect, the water resisting agent in the waterproof regions is formed to surround the gaps between the fibers, and thus the waterproof regions repel excrement such as urine. Therefore, the waterproof regions do not absorb excrement such as urine even after pets' excretion. Therefore, the appearance of the waterproof regions rarely changes between before excretion and after excretion.

On the other hand, a non-waterproof region not having the water resisting agent absorbs excrement such as urine and thus has a light characteristic similar to that of excrement such as urine. That is, the appearance of the non-waterproof region can significantly change before and after pets' excretion. The light transmission and/or reflection characteristic significantly differs between the non-waterproof region that has absorbed moisture and the waterproof region that rarely absorbs moisture, and thus the non-waterproof region in an excretion region to which excrement is attached becomes more noticeable. Therefore, it becomes possible to more accurately find out visually how far the region to which excrement is attached spreads.

According to one or more embodiments, a weight per unit area of the water resisting agent in the waterproof regions is 0.1 times or more a weight per unit area of the liquid-permeable sheet.

A ratio of the weight per unit area of the water resisting agent to the weight per unit area of the liquid-permeable sheet is 0.1 times or more, whereby, in the waterproof regions, a large amount of the water resisting agent is present in the hydrophilic fibers configuring the liquid-permeable sheet. Therefore, it becomes more difficult for the waterproof regions to absorb excrement such as urine, and thus the light transmission and/or reflection characteristic becomes more different between the non-waterproof region that has absorbed moisture and the waterproof region that does not absorb moisture. Therefore, the non-waterproof region in the excretion region to which excrement is attached becomes more noticeable.

According to one or more embodiments, the waterproof regions in the liquid-permeable sheet are smaller than the non-waterproof region not having the water resisting agent (i.e., the total are of the waterproof regions is smaller than the area of the non-waterproof region).

The waterproof regions are smaller than the non-waterproof region, and thus excrement excreted to the pet absorbent sheet does not excessively spread in a planar shape and is absorbed into the absorbent core from the non-waterproof region. Therefore, a region that is not contaminated by single excretion becomes relatively broad, and thus it is possible to provide a pet absorbent sheet capable of withstanding a plurality of times of use.

According to one or more embodiments, the plurality of waterproof regions is discontinuously provided, and the non-waterproof region not having the water resisting agent is disposed between the waterproof regions.

The non-waterproof region is present between the hydrophilic regions, whereby it becomes easier to find out a difference in appearance between the non-waterproof region that has absorbed moisture and the waterproof region that does not absorb moisture, and it is possible to more clearly find out how far excrement disperses.

According to one or more embodiments, the plurality of waterproof regions is discontinuously provided, the plurality of waterproof regions forms a first imaginary line connecting the waterproof regions adjacent to each other and a second imaginary line connecting the waterproof regions adjacent to each other, and the non-waterproof region not having the water resisting agent is disposed between the first imaginary line and the second imaginary line.

It is possible to more clearly find out how far excrement disperses by finding out whether or not the excrement reaches any one or both of the first imaginary line and the second imaginary line.

According to one or more embodiments, the plurality of waterproof regions is discontinuously or continuously provided and forms a plurality of diagram lines, and the non-waterproof region not having the water resisting agent is provided between the diagram lines adjacent to each other.

It is possible to more clearly find out how far excrement disperses by finding out whether or not the excrement reaches, among the plurality of diagram lines, which diagram line.

According to one or more embodiments, the liquid-permeable sheet including the hydrophilic fibers is disposed on an outermost top surface.

The liquid-permeable sheet having the hydrophilic fibers including the water resisting agent is disposed on the outermost top surface, and thus the waterproof regions more effectively repel moisture in excrement such as pets' urine. Therefore, the light transmission and/or reflection characteristic more significantly differs between the non-waterproof region that has absorbed moisture and the waterproof region that rarely absorbs moisture, and thus the non-waterproof region in an excretion region to which excrement is attached becomes more noticeable.

(2) Configuration of Pet Absorbent Sheet

Hereinafter, a pet absorbent sheet according to one or more embodiments will be described with reference to drawings. In the following description of the drawings, identical or similar portions will be given an identical or similar reference sign. The drawings are schematic, and attention needs to be paid to the fact that the ratio and the like of individual dimensions differ from the actual ones. Therefore, specific dimensions and the like need to be determined with reference to the following reference. In addition, dimensional relationships or ratios between portions are not always identical among the drawings.

In the present specification, "pets" broadly include vertebrate animals or invertebrate animals and typically include pet animals such as cats, dogs, rabbits, and hamsters.

Figure 2:
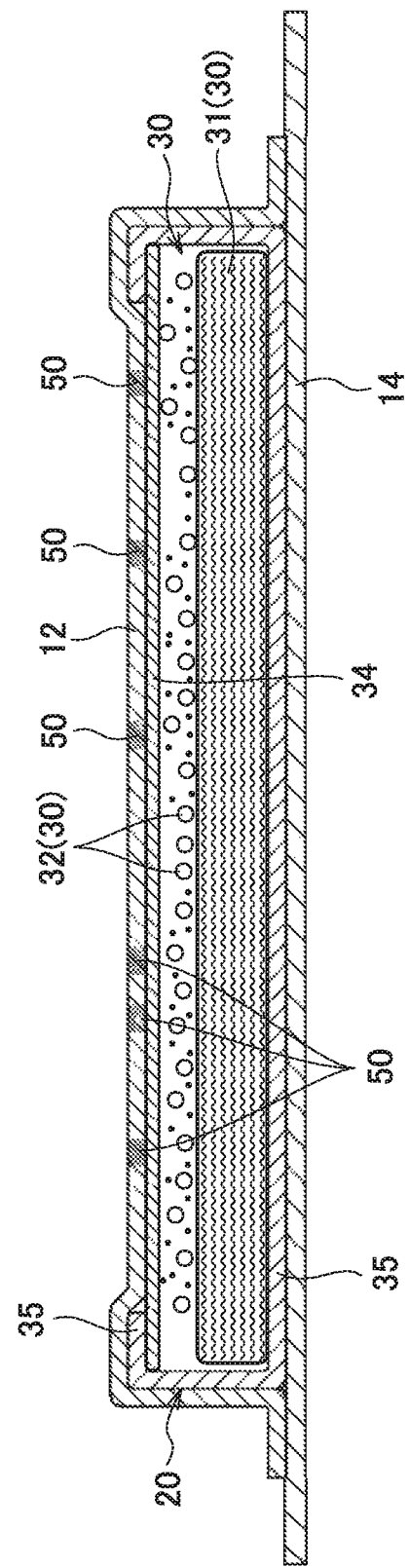
FIG. 2 is a schematic cross-sectional view of the pet absorbent sheet along an A-A line shown in FIG. 1.
Figure 3:
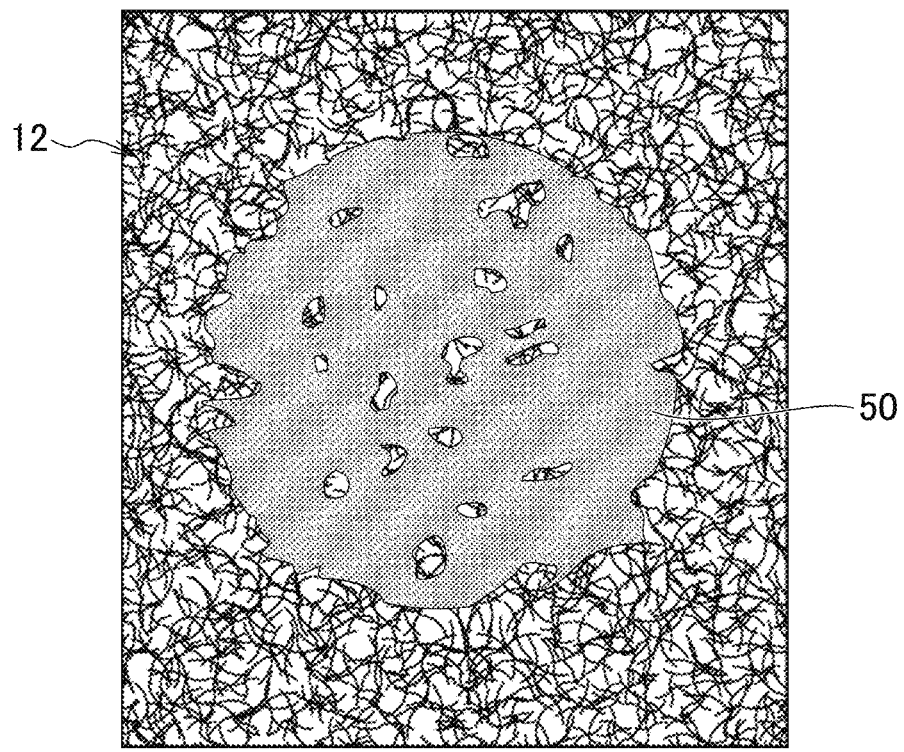
FIG. 3 is a schematic enlarged view of a vicinity of a waterproof region in the pet absorbent sheet.
Figure 4:
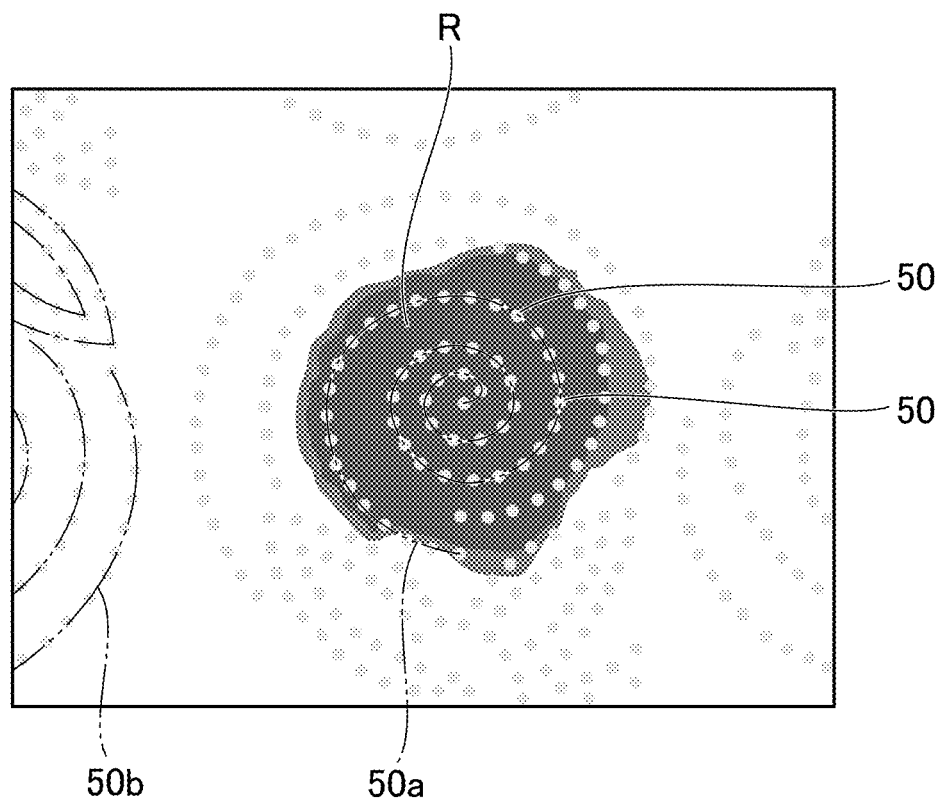
FIG. 4 is an enlarged plan view of a pet absorbent sheet to which excrement is partially attached.

FIG. 1 is a plan view of a pet absorbent sheet according to a first embodiment. FIG. 2 is a schematic cross-sectional view of the pet absorbent sheet along an A-A line shown in FIG. 1. FIG. 3 is a schematic enlarged view of a vicinity of a waterproof region in the pet absorbent sheet. FIG. 4 is an enlarged plan view of a pet absorbent sheet to which excrement is partially attached. A pet absorbent sheet 10 is generally a flat sheet. A top surface of the pet absorbent sheet 10 is a surface that receives pets' excrement and, hereinafter, will also be referred to as "excretion surface". FIG. 1 is a plan view of the pet absorbent sheet seen from an excretion surface side.

A pet absorbent sheet 10 has a top sheet 12 disposed on a top side, a back sheet 14 disposed on a back side, and an absorber 20 between the top sheet 12 and the back sheet 14. The absorber 20 may have an absorbent core 30 including an absorbent material that absorbs moisture in excrement and a cover layer 34 and a wrap layer 35 that wrap the absorbent core 30.

The absorbent core 30 is provided between the top sheet 12 and the back sheet 14. The top sheet 12 may be a liquid-permeable sheet that is permeable to liquid such as pets' excrement. The liquid-permeable sheet may be made of, for example, a liquid-permeable non-woven fabric. This liquid-permeable sheet includes a plurality of hydrophilic fibers, and gaps are formed between the plurality of hydrophilic fibers.

The back sheet 14 may be a liquid-impermeable sheet that is not permeable to liquid such as pets' excrement. The back sheet 14 is not particularly limited and may be made of, for example, a polymer film sheet. Part of the back sheet 14 may extend outside more than the top sheet 12. In this case, in an outer circumferential portion of the pet absorbent sheet 10, the back sheet 14 becomes visible from an excretion surface side.

The absorbent core 30 is not particularly limited and may include a hydrophilic fiber 31 such as pulp, a superabsorbent polymer (SAP) 32, or a combination thereof. As an example, in one or more embodiments, the superabsorbent polymer (SAP) 32 is provided on a hydrophilic fiber layer 31.

The pet absorbent sheet 10 may include the cover layer 34 that covers the excretion surface side of the absorbent core 30 and the wrap layer 35 provided on a non-excretion surface (back surface) side of the absorbent core 30. The wrap layer 35 is folded back toward the top side of the absorbent core 30 from the back side of the absorbent core 30 on a side surface of the absorbent core 30. A portion folded back toward the top side of the wrap layer 35 is located closer to the top side than an end portion of the cover layer 34. Therefore, both the cover layer 34 and the wrap layer 35 wrap the absorbent core 30.

The cover layer 34 and the wrap layer 35 may be made of a liquid-permeable sheet. This liquid-permeable sheet includes a plurality of hydrophilic fibers, and gaps are formed between the plurality of hydrophilic fibers. As such a liquid-permeable sheet, for example, tissue is exemplified.

The pet absorbent sheet 10 has waterproof regions 50 that contain a water resisting agent. For example, in one or more embodiments, the liquid-permeable sheet has the waterproof regions 50. As shown in FIG. 3, in the waterproof regions 50, the water resisting agent is formed to surround gaps between fibers formed of the plurality of hydrophilic fibers. In one or more embodiments, the water resisting agent is provided in the liquid-permeable sheet configuring the top sheet 12. Instead, the water resisting agent may also be provided in the liquid-permeable sheet configuring the cover layer 34. The water resisting agent needs to be provided in the liquid-permeable sheet including the plurality of hydrophilic fibers that are provided closer to the top side than the absorbent core 30 (i.e., above the absorbent core 30).

As shown in FIG. 2, the liquid-permeable sheet including the plurality of hydrophilic fibers provided with the water resisting agent is disposed on the outermost top surface, that is, the top sheet 12. In a case where the liquid-permeable sheet having the hydrophilic fibers including the water resisting agent is disposed on the outermost top surface, the waterproof regions 50 more effectively repel moisture in excrement such as pets' urine. Therefore, the light transmission and/or reflection characteristic more significantly differs between the non-waterproof region that has absorbed moisture and the waterproof region that rarely absorbs moisture, and thus the non-waterproof region in an excretion region to which excrement is attached becomes more noticeable.

Here, in a case where the amount, specifically, the amount per unit area of the water resisting agent is small, the water resisting agent is only attached to the top surfaces of the respective hydrophilic fibers and is not formed to surround gaps between fibers formed of the plurality of hydrophilic fibers as shown in FIG. 3. In one or more embodiments, it was possible to form the water resisting agent in the waterproof regions 50 to surround the gaps between the fibers by increasing the amount per unit area of the water resisting agent (refer to FIG. 3). Therefore, the waterproof regions 50 are capable of sufficiently repelling moisture in excrement. Therefore, the waterproof regions 50 do not absorb moisture in excrement even after pets' excretion. Therefore, the appearance of the waterproof regions 50 rarely changes between before excretion and after excretion (refer to FIG. 4).

On the other hand, a non-waterproof region not having the water resisting agent absorbs moisture in excrement and thus has a light characteristic similar to that of excrement. That is, the appearance of the non-waterproof region can significantly change before and after pets' excretion (refer to FIG. 4). The light transmission and/or reflection characteristic significantly differs between the non-waterproof region that has absorbed moisture and the waterproof region 50 that rarely absorbs moisture, and thus the non-waterproof region in an excretion region to which excrement is attached becomes more noticeable. Therefore, it becomes possible to more accurately find out visually how far the region to which excrement is attached (region R in FIG. 4) spreads.

The weight per unit area of the water resisting agent in the waterproof regions 50 may be 0.1 times or more or may be once or more the weight per unit area of the liquid-permeable sheet including the water resisting agent. Therefore, the weight per unit area of the water resisting agent becomes sufficiently large compared with the weight per unit area of the liquid-permeable sheet, and, in the waterproof regions 50, a large amount of the water resisting agent is present in the hydrophilic fibers configuring the liquid-permeable sheet. Therefore, it becomes more difficult for the waterproof regions 50 to absorb excrement such as urine, and thus the light transmission and/or reflection characteristic becomes more different between the non-waterproof region that has absorbed moisture and the waterproof region 50 that does not absorb moisture. Therefore, the non-waterproof region in the excretion region to which excrement is attached becomes more noticeable.

The area of the waterproof regions 50 may be smaller than the area of the non-waterproof region not having the water resisting agent in a plan view. The area of the waterproof regions 50 is smaller than the area of the non-waterproof region, and thus excrement excreted to the pet absorbent sheet does not excessively spread in a planar shape and is absorbed into the absorbent core 30 from the non-waterproof region. Therefore, a region that is not contaminated by single excretion becomes relatively broad, and thus it is possible to provide a pet absorbent sheet capable of withstanding a plurality of times of use.

The waterproof regions 50 including the water resisting agent may be arranged so as to form discontinuous regions. Instead, the waterproof regions 50 may extend in a linear or curved fashion so as to form a continuous line (diagram line). In one or more embodiments, the plurality of waterproof regions 50 is discontinuously provided (refer to FIG. 1), and the non-waterproof region not having the water resisting agent is disposed between the waterproof regions 50. The area of each of the waterproof regions 50 may be, for example, in a range of 0.5 to 1.5 mm$^2$. The non-waterproof region is present between the waterproof regions 50, whereby it becomes easier to find out a difference in appearance between the non-waterproof region that has absorbed moisture and the waterproof region 50 that does not absorb moisture, and it is possible to more clearly find out how far excrement disperses.

The plurality of waterproof regions 50 may form a first imaginary line 50a connecting the waterproof regions 50 adjacent to each other and a second imaginary line 50b connecting the waterproof regions 50 adjacent to each other. The plurality of waterproof regions 50 may be formed so as to draw a plurality of diagram lines by the imaginary lines 50a, 50b connecting the waterproof regions 50 adjacent to each other (refer to FIG. 4). The waterproof regions 50 draw a plurality of diagram lines, whereby it is possible to easily find out whether or not excrement reaches which diagram line. Therefore, it is possible to more clearly find out how far excrement disperses.

The imaginary lines 50a, 50b are defined by imaginary lines connecting the waterproof regions 50 that are adjacent enough to be regarded as "substantially connected lines" by the visual sense of a user. Specifically, the imaginary lines 50a, 50b may be imaginary lines connecting the waterproof regions 50 apart from each other by a distance that is 1.5 times or less the distance between the specific waterproof region 50 and the waterproof region 50 closest to the specific waterproof region 50. As an example, the imaginary line may be defined by a line connecting the waterproof regions 50 apart at an interval of 1 cm or less and for example 5 mm or less.

For example, the non-waterproof region not having the water resisting agent is disposed between the first imaginary line 50a connecting the waterproof regions 50 adjacent to each other and the second imaginary line 50b connecting the waterproof regions 50 adjacent to each other. For example, the non-waterproof region may be a region in which the interval between the first imaginary line 50a and the second imaginary line 50b exceeds 1 cm. As described above, the waterproof regions 50 serve as an index indicating how far excrement disperses. Therefore, according to the present aspect, it is possible to easily find out whether or not excrement reaches any one or both of the first imaginary line 50a and the second imaginary line 50b. Therefore, a user is capable of more clearly finding out how far excrement disperses.

The water resisting agent provided in the waterproof regions 50 may include a colorant. It is possible to create a color difference between the waterproof regions 50 and the non-waterproof region using the colorant. In this case, the color difference (ΔE) between the non-waterproof region and the waterproof region 50 when seen from the top side may be 10 or less, for example, 5 or less. Here, the color difference is defined by "L*a*b* color system".

In a case where the color difference between the non-waterproof region and the waterproof region is small as described above, it becomes difficult to visually differentiate the non-waterproof region and the waterproof regions 50 before the use of the pet absorbent sheet. However, when the non-waterproof region absorbs moisture in excrement, the non-waterproof region changes to a dim color. Therefore, the color difference between the non-waterproof region that has absorbed moisture in excrement and the waterproof region 50 becomes large. Therefore, to users or pets, the waterproof regions 50 in a region to which excrement is attached appear to protrude. Therefore, users or pets are able to more clearly find out the region to which excrement is attached. In order to further accelerate this effect, the top sheet 12 may be white. This is because, generally, excrement has a dim color.

In one or more embodiments, the waterproof regions 50 may be provided in at least embossed portions obtained by compressing the absorber 20 in the thickness direction. This embossed portion may be formed by compressing only the absorber 20 in the thickness direction or may be formed by compressing both the absorber 20 and the top sheet 12 in the thickness direction.

Next, experimental results of easiness in showing the waterproof regions 50 when excrement is attached onto the pet absorbent sheet 10 will be described. For experiments, a pet absorbent sheet according to a comparative example and the pet absorbent sheets 10 according to Examples 1 to 3 were prepared. The pet absorbent sheets according to the comparative example and Examples 1 to 3 have the same configuration as each other except for the fact that the weight per unit area of the water resisting agent differs.

In the comparative example and Examples 1 to 3, the water resisting agent is provided in the liquid-permeable sheet configuring the top sheet. The thickness of this liquid-permeable sheet was 0.12 mm, and the weight per unit area of the liquid-permeable sheet was 13.5 g/mm². The area of each of the waterproof regions 50 was approximately 1.0 mm².

In Example 1, the ratio of the weight per unit area of the water resisting agent to the weight per unit area of the liquid-permeable sheet was 8.4. In Example 2, the ratio of the weight per unit area of the water resisting agent to the weight per unit area of the liquid-permeable sheet was 3.9. In Example 3, the ratio of the weight per unit area of the water resisting agent to the weight per unit area of the liquid-permeable sheet was 0.34. In the comparative example, the ratio of the weight per unit area of the water resisting agent to the weight per unit area of the liquid-permeable sheet was 0.077. In the comparative example, the weight per unit area of the water resisting agent was small, and thus the water resisting agent was not formed to surround the gaps between the fibers formed of the plurality of hydrophilic fibers and was thinly attached onto the top surface of each hydrophilic fiber.

In the sensory evaluation, pseudo moisture that simulated pets' excrement was attached to the pet absorbent sheets of the comparative example and Examples 1 to 3, and the easiness in showing the waterproof regions 50 in the region to which the pseudo moisture was attached was visually evaluated (refer to Table 1).

TABLE 1

|  | Example 1 | Example 2 | Example 3 | Comparative Example |
|---|---|---|---|---|
| Weight per unit area of liquid-permeable sheet (g/m²) | 15.5 | 15.5 | 15.5 | 15.5 |
| Weight per unit area of water resisting agent (g/mm²) | 130 | 60 | 5.3 | 1.2 |
| Ratio of weight per unit area of water resisting agent to weight per unit area of liquid-permeable sheet | 8.4 | 3.9 | 0.34 | 0.77 |
| Easiness of visual perception | A | A | B | D |

An index "A" in the "easiness in visual perception" column of Table 1 indicates that the waterproof regions 50 extremely clearly appeared. An index "B" indicates the waterproof regions 50 clearly appeared. An index "C" indicates that the waterproof regions 50 were not noticeable. From the above-described sensory evaluation, it is found that the weight per unit area of the water resisting agent in the waterproof regions 50 may be 0.1 times or more, for example, once or more the weight per unit area of the liquid-permeable sheet.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

Reference Signs List

10 PET ABSORBENT SHEET
12 TOP SHEET
14 BACK SHEET
20 ABSORBER
30 ABSORBENT CORE
34 COVER LAYER
35 WRAP LAYER
50 WATERPROOF REGION
R EXCREMENT

What is claimed is:

1. A pet absorbent sheet comprising:
a top sheet disposed on a top side of the pet absorbent sheet;
an absorbent core; and
a cover layer made of a liquid-permeable sheet comprising a plurality of hydrophilic fibers, wherein
the cover layer is disposed between the top sheet and the absorbent core and covers an excretion surface side of the absorbent core,
the cover layer has waterproof regions containing a water resisting agent that surround gaps between fibers formed of the plurality of hydrophilic fibers,
an area of each of the waterproof regions is 1.5 mm² or less, and
the water resisting agent includes a colorant.

2. The pet absorbent sheet according to claim 1, wherein a weight per unit area of the water resisting agent is 0.1 times or more a weight per unit area of the cover layer.

3. The pet absorbent sheet according to claim 1, wherein the cover layer also has a non-waterproof region that does not contain the water resisting agent, and a total area of the waterproof regions on the cover layer is smaller than an area of the non-waterproof region.

4. The pet absorbent sheet according to claim 1, wherein the cover layer also has a non-waterproof region that does not contain the water resisting agent, the waterproof regions are discontinuously disposed, and the non-waterproof region is disposed between the waterproof regions.

5. The pet absorbent sheet according to claim 1, wherein the cover layer also has a non-waterproof region that does not contain the water resisting agent, the waterproof regions are discontinuously disposed, the waterproof regions form a first imaginary line connecting the waterproof regions adjacent to each other and a second imaginary line also connecting the waterproof regions adjacent to each other, and the non-waterproof region is disposed between the first imaginary line and the second imaginary line.

6. The pet absorbent sheet according to claim 1, wherein the cover layer has a non-waterproof region that does not contain the water resisting agent, and the waterproof regions are discontinuously or continuously disposed and form a plurality of diagram lines, and the non-waterproof region is disposed between the diagram lines adjacent to each other.

7. The pet absorbent sheet according to claim 1, wherein the cover layer also has a non-waterproof region that does not contain the water resisting agent, the waterproof regions are discontinuously disposed, and imaginary lines connecting the waterproof regions draw a plurality of diagram lines, the waterproof regions being adjacent to each other with an interval of 1 cm or less.

* * * * *